United States Patent [19]

Bergthaller et al.

[11] 4,284,718
[45] Aug. 18, 1981

[54] PHOTOGRAPHIC SILVER HALIDE MATERIALS CONTAINING SULFUR CONTAINING POLYMERS

[75] Inventors: Peter Bergthaller, Cologne; Wilhelm Saleck, Bergisch-Gladbach; Günter Helling, Cologne, all of Fed. Rep. of Germany

[73] Assignee: Agfa-Gevaert AG, Leverkusen, Fed. Rep. of Germany

[21] Appl. No.: 175,898

[22] Filed: Aug. 6, 1980

[30] Foreign Application Priority Data

Aug. 11, 1979 [DE] Fed. Rep. of Germany ....... 2932690

[51] Int. Cl.³ .............................................. G03C 1/72
[52] U.S. Cl. .................................... 430/629; 430/569
[58] Field of Search .............................. 430/629, 569

[56] References Cited

U.S. PATENT DOCUMENTS

| 3,168,403 | 2/1965 | Himmelmann et al. ............. 430/629 |
| 3,713,833 | 1/1973 | Lindholm et al. ................... 430/629 |
| 3,860,428 | 1/1975 | Ponticello et al. .................. 430/629 |

Primary Examiner—Jack P. Brammer
Attorney, Agent, or Firm—Connolly and Hutz

[57] ABSTRACT

Polymers, containing polymerized units of at least one compound of the formula

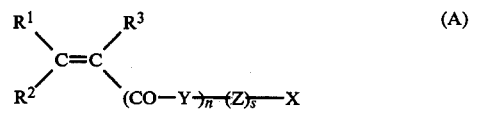

(A)

and at least one compound of the formula

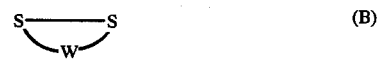

(B)

are useful for the preparation of silver halide emulsions.

6 Claims, No Drawings

PHOTOGRAPHIC SILVER HALIDE MATERIALS CONTAINING SULFUR CONTAINING POLYMERS

This invention relates to new sulphur-containing polymers, to a process for their production, to their use in the precipitation of photographic emulsions and to photographic materials containing the polymers according to the invention.

The precipitation of photographic silver halide emulsions is generally carried out using gelatin as the peptising agent. Gelatin has excellent protective colloid properties, is capable of reversible gel formation and acts as a halogen acceptor in the elementary photographic process.

However, the use of gelatin is also known to be attended by disadvantages. As a natural product, gelatin is difficult to produce to constant quality so far as the photographically important properties are concerned and is prone to attack by microbes and enzymes. In addition, at relatively high temperatures and at pH-values differing considerably from the neutral point, it undergoes rapid hydrolytic degradation. Accordingly, limitations in the conditions under which emulsions are precipitated have to be accepted in cases where gelatin is used. In addition, gelatin undergoes dimensional changes when exposed to varying temperature and humidity conditions. Finally, the use of gelatin involves limitations in regard to the potential crystallographic and photographic properties of the silver halide crystals, for example with regard to crystal form, crystal growth and particle size distribution.

These disadvantages have frequently prompted efforts to replace gelatin completely or in part by synthetic peptising agents. Thus, it is known that polyvinyl pyrrolidone and polyvinyl alcohol are suitable for use as protective colloids, but unfortunately inhibit the growth of silver halide crystals to a considerable extent. Copolymers of acrylamide and its derivatives are proposed as peptising agents in U.S. Pat. No. 2,811,494. Polyacrylamide itself has an inadequate protective-colloid effect. In order to improve the protective colloid effect, it is possible to use corresponding co-polyacrylamides containing groups with an affinity for silver halide which are incorporated through special comonomers during the copolymerisation reaction.

Particular importance is attributed to the incorporation of thioether groups into the side chains of a copolymer skeleton, as proposed for example in German Offenlegungsschrift No. 1,904,147. In this case, acrylic esters or acrylamides carry the thioether groups and contain 1 or 2 thioether groups in the side chain. However the side chains are sensitive to hydrolysis and are hence, unstable. In addition, the starting monomers required can only be obtained by complicated processes.

Copolymers of vinylsulphides containing 1 or 2 thioether groups are known from U.S. Pat. No. 3,860,428. In this case, too, the starting monomers required can only be obtained by difficult processes. In addition, the protective colloid effect of the polymers with respect to silver halide is only in evidence with a relatively high polymer content, based on the silver halide. In general, a good protective colloid effect is only obtained with a quantity of from 1.5 to 2 times the corresponding quantity of gelatin.

One of the objects of the present invention is to provide new polymers which avoid the disadvantages attending the known polymers. More particularly, an object of the present invention is to provide synthetic peptising agents for photographic silver halide emulsions which are capable of completely or partly replacing gelatin in the precipitation of the silver halide and the use of which leads to improved photographic properties of the silver halide emulsions. In particular, the invention seeks to improve the developability, stability in storage, insensitivity to pressure and the sensitive/-fogging ratio of the emulsion in relation to an emulsion produced with gelatin.

Accordingly, the present invention relates to:

(1) New polymers containing polymerised units of at least one compound A and at least one compound B which correspond to the following formulae:

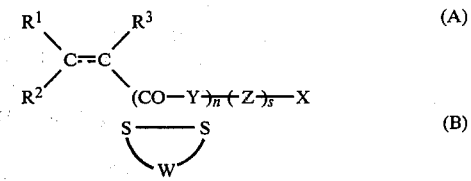

in which:

$R^1$ represents hydrogen or an alkyl group, particularly containing from 1 to 4 carbon atoms, especially a methyl groups;

$R^2$ represents hydrogen, an alkoxy carbonyl group, particularly containing from 1 to 4 carbon atoms in the alkyl moiety; or a carboxyl group;

$R^3$ represents hydrogen an alkyl group, particularly containing from 1 to 8 carbon atoms; a cycloalkyl group, particularly containing from 5 to 6 carbon atoms, especially a cyclopentyl or cyclohexyl group; an aralkyl group, particularly containing 1 or 2 carbon atoms in the aliphatic portion and from 6 to 12 carbon atoms in the aromatic portion, especially a benzyl group; an aryl group, particularly containing from 6 to 12 carbon atoms, especially a phenyl group; a heterocyclic ring, particularly a 2-thienyl ring; a carboxyl group or an alkoxy carbonyl group, particularly containing from 1 to 4 carbon atoms in the alkoxy portion;

Y represents —O— or —NR$^4$—;

$R^4$ represents hydrogen; an alkyl group particularly containing from 1 to 4 carbon atoms; or a hydroxy alkyl group, particularly containing from 1 to 4 carbon atoms, especially hydroxy ethyl or hydroxy propyl group;

Z represents a difunctional organic radical, preferably:

(a) alkylene, particularly containing from 1 to 5 carbon atoms; or (b) arylene, particularly phenylene; X represents hydrogen; a hydroxyl group; or an —O-alkyl, —S-alkyl, —SO-alkyl or —CO-alkyl group the alkyl portion containing in particular from 1 to 6 carbon atoms; a carboxyl group; a —CONR$^5$R$^6$; NR$^5$R$^6$ or SO$_3$M group; a heterocyclic group, particularly an imidazolyl or, pyridyl group;

$R^5$ and $R^6$, which may be the same or different, represent alkyl groups, particularly containing from 1 to 6 carbon atoms or, may together, represent the atoms required to complete a heterocyclic group particularly a saturated heterocyclic group;

M represents hydrogen or a cation, particularly an alkali metal cation, n=0 or 1, s=0 or 1, W represents a difunctional hydrocarbon radical, particularly an alkylene, especially $C_1-C_9$ alkylene, or arylene radical, especially phenylene, or a hydrocarbon radical containing at least one alkylene-arylene group, the alkylene, arylene or alkylene/arylene group optionally being interrupted by at least one heteroatom, particularly —O—, —S— or —NR$^8$—;

R$^8$ represents an alkyl group, particularly containing from 1 to 8 carbon atoms; an acyl group an alkoxy carbonyl group, particularly containing from 1 to 4 carbon atoms in the alkoxy portion;

or an aminocarbonyl or sulphonyl group, and/or R$^4$ together with Z and/or X represents the atoms required to complete a heterocyclic ring, particularly a 5- or 6-membered nitrogen-containing ring.

The above-mentioned substituents may in turn be substituted, particularly by substituents which are either inert with respect to or have a favourable effect on the photographic properties. For example, the difunctional hydrocarbon radical W may be substituted by alkyl, hydroxy alkyl, alkyl thioalkyl, carboxy alkyl, alkoxy carbonyl alkyl and hydroxyl groups.

Preferred acyl radicals are derived from aliphatic or aromatic carboxylic or sulphonic acids, including (thio)carbonic acid monoesters, carbamic acids and sulphamic acids. Particularly preferred acyl radicals are acetyl, benzoyl, phenyl sulphonyl, carbamoyl, phenyl carbamoyl, ethoxy carbonyl and ethoxy thiocarbonyl radicals.

The present invention also relates to:

(2) a process for producing the polymers according to the invention in which compounds corresponding to the formulae A and B are polymerised with one another in the presence of polymerisation initiators and optionally in the presence of solvents;

(3) the use of the polymers according to the invention as peptising agents in the precipitation of silver halide emulsions, the polymers being capable of completely or partly replacing the gelatin normally used;

(4) a photosensitive photographic material consisting of a support layer and at least one photosensitive silver halide emulsion layer and, optionally, further layers, characterised by a content of at least one polymer according to the invention which is preferably contained in a silver halide emulsion layer.

The following are particularly advantageous monomers corresponding to formula A: neutral monomers, such as acrylamide; 2-hydroxyethyl acrylamide; 2-hydroxy propyl acrylamide; N-tris-methylol methyl acrylamide; N-methyl acrylamide; N-ethyl acrylamide; N-isopropyl acrylamide; diacetone acrylamide; methacrylamide; acryloyl glycine amide; acryloyl glycine ethyl ester; N,N-dimethyl acrylamide; N,N-diethyl acrylamide; N-acryloyl pyrrolidine; acryloyl piperidine; 4-acryloyl morpholine; 4-methacryloyl morpholine; N-acryloyl-N'-formyl diethylene diamine; N-acryloyl-N'-acetyl ethylene diamine; N-acryloyl-N'-carbamoyl ethylene diamine; N,N'-dimethyl-N-acryloyl-N'-formyl ethylene diamine; formamido-3-acylamido propane; 3,5-dimethyl-4-acryloyl morpholine; 4-acryloyl thiomorpholine; 4-methacryloyl thiomorpholine; 2-acetamino acrylester; N-vinyl pyrrolidone; N-vinyl valerolactam; N-vinyl caprolactam; N-vinyl oxazolidine-2-one; N-vinyl-5-methyl oxazolidine-2-one; N-vinyl-3-morpholine according to British Pat. No. 849,038; N-vinylcarbamic acid esters according to U.S. Pat. No. 4,089,688, for example N-vinyl-5-t-butyl carbamate; N-vinyl ureas according to the article by R. Hart in Bull. Soc. Chim. Belg. 66, 229–243 (1957); N-vinyl carboxylic acid amides according to German Auslegeschrift No. 1,224,304, for example, N-vinyl formamide and N-vinyl acetamide; N-vinyl-N-methyl formamide, N-vinyl-N-propyl acetamide according to Breederveld, Rec. Trav. Chim. Pays Bas 79, 401 (1960); the hydroxy alkyl esters of acrylic acid and methacrylic acid and, finally, 2-methylene-1,3-propane diol and its esters; hydrophobic, neutral monomers such as, in particular, the esters and nitriles of lower ethylenically unsaturated carboxylic acids and dicarboxylic acids;

anionic or acid monomers such as, in particular, acrylic acid; methacrylic acid; ethylacrylic acid; crotonic acid; maleic acid; itaconic acid; citraconic acid; N-acryloyl glycine; N-acryloyl sarcosine; N-acryloyl methionine; the methacryloyl derivatives of α-amino acids; the monoesters and monoamides of maleic acid, itaconic acid and citraconic acid obtained by reacting the corresponding anhydrides with simple alcohols or amines; also vinyl phosphonic acids; vinyl sulphonic acids; which may be in the form of their alkali salts; acryloyl and methacryloyl taurine; the N-alkylated acryloyl and methacryloyl taurines; 2-acryloyl amino methyl propane-2-sulphonic acid, which may be in the form of its alkali salts; also the alkali salts of acryloyloxy propane-3-sulphonic acid, acryloyloxy butane-4-sulphonic acid, methacryloyloxy propane sulphonic acid, methacryloyloxy butane sulphonic acid, finally the taurides methyl taurides and butyl taurides of maleic acid, itaconic acid and citraconic acid; cationic or basic monomers, in particular N-vinyl imidazole 2-vinyl imidozole, 1-vinyl-2-methyl imidazole, 1-(3-acryloyl amino)-propyl imidazole, 1-(3-methyacrylolyamino)-propyl imidazole, the vinyl pyridines and, finally, the esters, amides and N-alkyl amides of acrylic acid, methacrylic acid and crotonic acid substituted by tertiary amino groups. Particularly suitable basic monomers are described in German Offenlegungsschrifts Nos. 2,506,405; 2,312,708 and 2,400,537. The basic monomers are preferably present during the copolymerisation reaction in the form of their salts with monobasic strong inorganic or organic acids, for example in the form of hydrochlorides, ethyl sulphates, methane sulphonates, ethane sulphonates or trifluoroacetates.

Neutralisation may also be obtained through the acid monomers present in the comonomer mixture. Particularly preferred basic monomers are the guanyl hydrazones of diacetone acrylamide which may be substituted in the guanidine portion. They are preferably formed in the copolymer by reacting diacetone acrylamide monomer units present therein with aminoguanidines.

Although not necessary, the incorporation of monomers which improve the adsorption of the copolymer on silver halide crystals, for example monomers containing thioether groups, does in some cases lead to reduce sensitivity to pressure and to an additional improvement in the storability of silver halide emulsions produced in accordance with the invention.

Particularly advantageous compounds corresponding to formula B are shown in Table 1 below:

TABLE 1

| Compound No. | Structure | Physical data |
|---|---|---|
| Compound 1.1 Schoberl, Grafe Liebigs Ann. Chemie 614 pages 66–82 (1958) | CH$_2$–S–CH$_2$–CH$_2$–S (cyclic with S–S) | yellow oil, Bp |
| Compound 1.2 | HO–CH(–CH$_2$–S–S–) (1,2-dithiolane with OH) | pale yellow non-distillable oil |
| Compound 1.3 | CH$_3$–NH–CO–O–CH(–CH$_2$–S–S–) | Mp: 65–68° C. |
| Compound 1.4 | 1,2-dithiolane–(CH$_2$)$_4$–COOH | commercial product thioct acid Mp: 59–61° C. |
| Compound 1.5 Luttringhaus, Hagele Angew. Chemie 67, 304 (1955) | benzo-fused 1,2-dithiolane | Bp$_{12}$: 133° C. orange-coloured liquid |
| Compound 1.6 Price, Smiles J. Chem. Soc. London 1928, page 2374 | naphthalene 1,8-disulphide | Mp: 116° C. |
| Compound 1.7 Schoberl, Grafe Liebigs Ann. Chem. 614, pages 66 et seq | (CH$_2$)$_5$ ring with S–S | Mp: 31° C. |
| Compound 1.8 | indane-fused S–S | Mp: 77–78° C. |
| Compound 1.9 | O(CH$_2$CH$_2$)$_2$ ring with S–S bridge | Bp$_5$: 70–75° C. |
| Compound 1.10 | S(CH$_2$CH$_2$)$_2$ ring with S–S bridge | Mp: 68–70° C. |
| Compound 1.11 | C$_4$H$_9$–NH$^{\oplus}$(CH$_2$CH$_2$)$_2$ ring with S–S, Cl$^{\ominus}$ | pale yellowish wax soluble in ethanol |
| Compound 1.12 | HCO–N(CH$_2$CH$_2$)$_2$ ring with S–S | yellowish wax |
| Compound 1.13 | CH$_3$–S–CH(–S–S–)CH–S–CH$_3$, N–CHO | yellowish wax |
| Compound 1.14 | CH$_3$–S–CH(–S–S–)CH–S–CH$_3$, N–SO$_2$CH$_3$ | Mp: 90–95° C. |
| Compound 1.15 | 1,2-dithiolane–(CH$_2$)$_4$–CONH$_2$ | Mp: 127–129° C. |

The disulphide compounds corresponding to formula B are either known from the literature or may be ob- The disulphide bond is normally introduced in known manner by oxidising a bis-thiol, hydrolysing a bis-thiosulphate or oxidising a bis-thiosulphate. Suitable oxidising agents are hydrogen peroxide, alkali persulphates alkali hypochlorites or chlorites, free halogen, salts or complexes of metals in relatively high stages of oxidation, for example iron(III)chloride, and also organic oxidising agents, such as sulphury chloride. It is particularly preferred to use dimethyl sulphoxide, especially since it dissolves starting thiols and disulphides equally effectively and only forms readily separable secondary products, such as dimethyl sulphide and water. In addition, the oxidation reaction takes place under mild conditions (cf. J. Org. Chem. 28. 3246 (1963); J. Am. Chem. Soc. 84, 2652 (1962)). The possibility of producing disulphides from the thiol with the system thiourea+hydrogen peroxide by way of the corresponding S-alkyl mercapto isothiuronium salts is mentioned by Sinakawa in Chem. Pharm. Bull. 18 (2), pages 235-242 (1970).

The radical copolymerisation of ethylenically unsaturated monomers in the presence of the cyclic disulphides is carried out by methods known in principle in the presence of polymerisation initiators. In this connection, reference is made to Ian M. G. Cowie "Chemie und Physik der Polymeren", page 52, Verlag Chemie, Weinheim 1976, and also to Chapter IId entitled "Erniedrigung des Molekulargewichts durch Regler" (Reduction of Molecular Weight by Regulators) in Houben-Weyl, Methoden der Organischen Chemie, Vol. XIV/1, pages 318-327.

Typical intiators suitable for the purposes of the invention are azo-isobutyronitrile; 2,2'-azo-bis-(2,4-dimethyl valeronitrile); symmetrical azo-bis-mercapto compounds according to German Offenlegungsschrift No. 2,518,622; di-t-butyl peroxide; t-butyl cumyl peroxide; dicumyl peroxide; 4,4'-di-t-butyl peroxy valeric acid-n-butyl ester; t-butyl peracetate; t-butyl perpivalate; t-butyl perbenzoate; t-butyl peroxy isopropyl carbonate; t-butyl peroxy-2-ethyl hexanoate; diisoprpyl peroxy dicarbonate; dipropionyl peroxide; dioctanoyl peroxide; dilauroyl peroxide; dibenzoyl peroxide; dicyclohexyl peroxy dicarbonate and potassium persulphate, which may be in combination with bisulphite as redox initiator. The type of initiator used is largely dependent on the polymerisation conditions selected and upon the type of monomers used.

In this connection, reference is made to Houben-Weyl, Methoden der Organischen Chemie, 4th Edition, 1961, Vol XIV/1, pages 209 et seq.

The optimal initiator may readily be found by comparison tests. The constitution of the disulphide generally has no bearing on the choice of the initiator.

The polymerisation reaction is preferably carried out by precipitation polymerisation. The polymerisation temperature may be varied to a certain extent and, in most cases, is in the range of from 80° to 120° C. Suitable polymerisation media are substantially or completely anhydrous solvents and mixtures thereof. The following solvents are preferred: methanol (in admixture with relatively high boiling solvents); ethanol; n-propanol; isopropanol; n-butanol; isobutanol; t-butanol; acetonitrile; propionitrile; ethyl acetate; butyl acetate; 1,2-dimethoxy ethane; dioxane; 2-methoxy ethanol; dimethyl sulphoxide; N-methyl pyrrolidone; sulpholan, acetic acid; chlorobenzene and o-dichlorobenzene. The weak chain-transfer properties of some of these solvents have a favourable effect in many cases, so that the formation of gel-containing polymers is prevented.

The copolymers according to the invention generally have an average molecular weight in the range from about 5000 to 100,000. Particularly suitable peptising agents are copolymers having an average molecular weight of from 10,000 to 50,000. The content of the polymerised compound B is in the polymer of compounds A and B amounts to between 0.5 and 5% by weight and preferably to between 1 and 3% by weight, based on the polymer.

The optimum content of thioether groups is largely determined by the choice of the monomers from which the polymer is formed by copolymerisation. In general, a sulphur content of from 0.3 to 1% by weight, based on the total polymer, is sufficient for a good protective colloid effect.

A sulphur content in this range is generally obtained by copolymerisation A in the presence of from 2 to 50 mole percent of B, based on A, only a fraction of the disulphide B available actually being incorporated, the rest remaining in the mother liquor during separation of the precipitation polymer.

The production of some of the polymers according to the invention is described by way of example in the following:

Compound 2.1:

Solutions A and B adjusted to the same volume are simultaneously added dropwise over a period of 1 hour under nitrogen to a solution, boiling under reflux, of 0.5 ml of t-butyl peroctoate in 100 ml of t-butanol and 50 ml of chlorobenzene:

(A)
    63.9 g (0.9 mole) of acrylamide
    3.6 g (0.05 mole) of acrylic acid
    5.55 g (0.05 mole) of N-vinyl pyrrolidone in 430 ml of t-butanol.

(B)
    2 g of 1,2,5-trithiacycloheptane (compound 1.10) in 500 ml of chlorobenzene.

The mixture is refluxed for 6 hours at 82° C. and then cooled to 60° C. The powder-form polymer is filtered off under suction and washed with 300 ml of chlorobenzene and 300 ml of t-butanol. It is then dried in vacuo at 50° C.

Yield: 70 g (93% of the theoretical)
analysis: $S_{calculated}$: 1.68%; $S_{observed}$: 0.7%

The polymers according to the invention indicated in Table 2 below are produced by the same process:

TABLE 2

| Copolymer No. | Starting Compounds A (in moles) | B | S observed |
|---|---|---|---|
| 2.2 | acrylamide (0.85) acrylic acid (0.10) vinyl imidazole (. HCl) (0.05) | 2.0 g of compound 1.10 | 0.75 |
| 2.3 | acrylamide (0.7) | 2.0 g of compound 1.10 | 0.56 |

TABLE 2-continued

| Copolymer No. | Starting Compounds A (in moles) | B | S observed |
|---|---|---|---|
| 2.4 | acrylic acid (0.1) N-vinyl pyrrolidone (0.2) acrylamide (0.7) N,N-diethyl acrylamide (0.15) methacrylic acid (0.15) | 2.0 g of compound 1.10 | 0.78 |
| 2.5 | acrylamide (0.5) acrylic acid-2-hydroxy ethyl ester (0.2) (acrylic acid (0.2) | 2.0 g of compound 1.10 | 0.60 |
| 2.6 | acrylamide (0.7) butyl acrylate (0.2) (acrylamidomethyl propane sulphonic acid, Li-salt (0.1) | 2.0 g of compound 1.13 | 3.5 |
| 2.7 | acrylamide (0.4) N-vinyl pyrrolidone (0.4) Li sulphopropyl acrylate (0.2) | 3.0 g of compound 1.13 | |
| 2.8 | acrylamide (0.7) N-vinyl-N-ethyl acetamide (0.2) itaconic acid (0.1) | 2 g of compound 1.4 | 0.48 |
| 2.9 | acrylamide (0.5) acrylic acid (0.2) methacrylic acid (0.2) N-vinyl caprolactam | 3 g of compound 1.11 | 0.8 |
| 2.10 | acrylamide (0.7) hydroxy ethyl methacrylate (0.2) 1-vinyl-2-methyl imidazole (0.1) (in the form of its trifluoracetate) | 3 g of compound 1.3 | 0.35 |
| 2.11 | acrylamide (0.95) N-(3,6-dithiaoctyl)- acrylamide (0.05) | 2 g of compound 1.6 | 4.3 |

In the production of photographic silver halide emulsions, the polymers according to the invention are preferably added to the photographic silver halide emulsion before chemical ripening and preferably during the actual precipitation process. The quantity added depends on the required effect and may readily be determined by a few simple tests.

The compounds according to the invention may be used in quantities which produce an increase in sensitivity. The peptising agent used as protective colloid during precipitation of the silver halide may consist of for example of 10 to 100% by weight of the polymer according to the invention, the rest of the peptising agent preferably being formed by gelatin. The polymer according to the invention is generally used in a quantity of from 10 to 200 g and preferably in a quantity of from 20 to 100 g per mole of silver halide to be precipitated.

The polymers according to the invention may be used in the form of an aqueous solution. Their concentration in this solution is not critical and may vary within wide limits. The polymers are preferably sufficiently soluble in water to make it possible for a sufficiently concentrated aqueous solution to be prepared. For example, it is even sufficient to use a 1 to 5% aqueous solution. Where particularly soluble substances are used, the solution may of course be even more concentrated.

In general, the solutions are prepared with a pH of the order of 7. However, it is also possible to keep the pH value of the solution in the weakly acid range, for example in the range from 5 to 7, or where so-called ammonia emulsions are used the solutions may even be kept at a pH value in the range from 5 to 9.

The present invention is suitable for photographic materials containing any silver halide emulsions. The silver halide present in these emulsions may consist of silver bromide, silver chloride or mixtures thereof, which may have a small silver iodide content of up to 10 mole percent.

The photographic materials may be developed with standard developer substances, for example N,N-dimethyl-p-phenylene diamine; 4-amino-3-methyl-N-ethyl-N-methoxy ethyl aniline; 2-amino-5-diethyl aminotoluene; N-butyl-N-ω-sulphobutyl-p-phenylene diamine; 2-amino-5-(N-ethyl-N-β-methane-sulphonamidoethylamino)-toluene; N-ethyl-N-β-hydroxy ethyl-p-phenylene diamine; N,N-bis-(β-hydroxy ethyl)-p-phenylene diamine or 2-amino-5-(N-ethyl-N-β-hydroxyethylamino)-toluene. Other suitable colour developers are described for example in J. Amer. Chem. Soc. 73, 3100 (1951).

The photographic material may contain the usual colour couplers which may be incorporated in the silver halide layers themselves. Examples of suitable colour couplers may be found in the article entitled "Farbkuppler (Colour Couplers)" by W. Pelz in "Mitteilungen aus den Forschungslaboratorien der Agfa, Leverkusen/Munchen", Vol III (1961) and in K. Venkataraman's book entitled "The Chemistry of Synthetic Dyes", Vol 4, 341 to 387, Academic Press, 1971.

Other suitable non-diffusing colour couplers are 2-equivalent couplers, for example the known DIR couplers. The non-diffusing colour couplers and dye-producing compounds may be added to the photosensitive silver halide emulsions or to other casting solutions by the usual methods.

Where the non-diffusing colour couplers and dye-producing compounds are water-insoluble or alkaliinsoluble compounds, they may be emulsified in known manner. So-called coupler solvents or oil formers may additionally be used for incorporating hydrophobic compounds such as these by emulsification; cf. for example U.S. Pat. Nos. 2,322,027; 2,533,514; 3,689,271; 3,764,336 and 3,765,897.

Gelatin is preferably used as the binder for the photographic layers. However, it may be completely or partly replaced by other natural or synthetic binders.

The emulsions may also be chemically sensitised, for example by the addition during chemical ripening of sulphur-containing compounds, for example allyl isothiocyanate, allyl thiourea and sodium thiosulphate. Other suitable chemical sensitisers are reducing agents, for example the tin compounds described in Belgian Pat. Nos. 493,464 or 568,687, also polyamines, such as diethylene triamine or aminomethyl sulphinic acid derivatives, for example according to Belgian Pat. No. 547,323. Other suitable chemical sensitisers are noble metals and noble metal compounds, such as gold, platinum, palladium, iridium, ruthenium or rhodium. The emulsions may also be sensitised with polyalkylene oxide derivatives, for example with polyethylene oxide having a molecular weight in the range from 1000 to 20,000, and with condensation products of alkylene oxides and alcohols, aliphatic carboxylic acids, aliphatic amines, aliphatic diamines and amides.

The emulsions may also be optically sensitised, for example with the usual polymethine dyes, such as neutrocyanines, basic or acid carbocyanines, rhodacyanines, hemicyanines, styryl dyes and oxonoles. Sensitisers such as these are described in F. M. Hamer's book entitled "The Cyanine Dyes and Related Compounds", (1964).

The emulsions may contain the usual stabilisers such as, for example, homopolar or salt-like compounds of mercury with aromatic or heterocyclic rings, such as mercaptotriazoles, sing mercury salts, sulphonium-mercury double salts and other mercury compounds. Other suitable stabilisers are azaindenes, perferably tetra- or penta-azaindenes, particularly those substituted by hydroxyl or amino groups. Compounds such as these are described for example in the article by Birr in Z. Wiss. Phot. 47 (1952), pages 2 to 58. Other suitable stabilisers are inter alia heterocyclic mercapto compounds, for example phenyl mercapto tetrazole, quaternary benzthiazole derivatives and benzotriazole.

The layers of the photographic material may be hardened in the usual way, for example with formaldehyde or halogen-substituted aldehydes containing a carboxyl group, such as mucobromic acid, diketones, methane sulphonic acid esters and dialdehydes. The photographic layers may also be hardened with hardeners of the epoxide, hetercyclic ethylene imine or acryloyl type. The layers may also be hardened by the process according to German Offenlegungsschrift No. 2,218,009 in order to obtain colour-photographic materials which are suitable for processing at high temperatures. It is also possible to harden the photographic layers or colour-photographic multilayer materials with the diazine, triazine or 1,2-dihydroquinoline hardeners. Examples of hardeners such as these are diazine derivatives containing alkyl or aryl sulphonyl groups, derivatives of hydrogenated diazines or triazines such as, for example 1,3,5-hexahydrotriazine, fluorine-substituted diazine derivatives such as, for example, fluoropyrimidine, esters of disubstituted 1,2-dihydroquinoline- or 1,2-dihydroisoquinoline-N-carboxylic acids. Other suitable hardeners are vinyl sulphonic acid hardeners carbodiimide or carbamoyl hardeners of the type described for example German Offenlegungsschrift Nos. 2,263,602; 2,225,230 and 1,808,685, in French Pat. No. 1,491,807, in German Pat. No. 872,153 and in East German Pat. No. 7218. Other suitable hardeners are described for example in British Pat. No. 1,268,550.

EXAMPLE 1

Sample 1, Comparison:

To produce a silver bromide iodide gelatine emulsion the following solutions are prepared:

| Solution (A) | 1000 ml of water |
| | 10 g of gelatin |
| | 30 g of potassium bromide |
| | 2 g of potassium iodide |
| | temperature 50° C. |
| Solution (B) | 1000 ml of water |
| | 40 g of silver nitrate |
| | temperature 45° C. |

Solution B is uniformly cast over a period of 5 minutes into solution A, after which the combined solutions are digested for 30 minutes at 50° C. and then cooled to 20° C. 10 ml of a 10% aqueous polystyrene sulphonic acid solution are then added and the pH value is reduced to 3.0 with sulphuric acid (25%), as a result of which the emulsion flocculates out.

The whole is allowed to sediment and the supernatant solution is poured off. For chemical ripening, the flocculate is dissolved at 40° C. in 2000 ml of a 10% aqueous gelatin solution (pH 7.5).

After dissolution of the flocculate, the pH is adjusted to 6.5, a corresponding quantity of standard sulphur ripeners and gold salts is added and the emulsion is ripened to full sensitivity at 55° C. 10 ml/kg of a 5% aqueous solution of saponin (wetting agent), 10 ml/kg of a 10% aqueous solution of formaldehyde (hardener) and 20 ml/kg of a 1% methanolic solution of 4-hydroxy-6-methyl-1,3,3a,7-tetra-azaindene (stabiliser) are added to the emulsion which is then cast onto a cellulose acetate support layer. After exposure behind a step wedge in a standard sensitometer and development (7 and 16 minutes at 20° C.) in a developer having the following composition:

| | |
|---|---|
| sodium sulphite sicc. | 70.0 g |
| borax | 7.0 g |
| hydroquinone | 3.5 g |
| p-monomethyl aminophenol sulphate | 3.5 g |
| sodium citrate | 7.0 g |
| potassium bromide | 0.4 g |
| made up with water to 1 liter, | | the material is subjected to sensitometric evaluation. Samples 2 to 5, invention:

These emulsions are prepared in the same way as Sample 1, except that all of the gelatin of solution A is successively replaced by the same quantity by weight of one of the above-described polymers 1.1 and 1.3 to 1.5. After precipitation of the silver halide, 10 g of gelatin in the form of a 10% aqueous solution are added, after which the emulsion is flocculated with polystyrene sulphonic acid and by reducing the pH to 3.0 with sulphuric acid. The Samples are then further treated in the same way as described for Sample 1.

| Sample No. | Polymer No. | 7 minutes development | | | 16 minutes development | | |
|---|---|---|---|---|---|---|---|
| | | E | γ | fog | E | γ | fog |
| 1 | none | 100 | 1.15 | 0.11 | 125 | 1.50 | 0.19 |
| 2 | 1.1 | 125 | 1.40 | 0.09 | 150 | 1.70 | 0.18 |
| 3 | 1.3 | 150 | 1.20 | 0.09 | 175 | 1.75 | 0.14 |
| 4 | 1.4 | 120 | 1.00 | 0.12 | 150 | 1.20 | 0.22 |
| 5 | 1.5 | 150 | 1.30 | 0.10 | 150 | 1.78 | 0.16 | in this Table:
E = relative sensitivity; a doubling of E corresponds to a doubling of sensitivity
γ = gradation The advantageous properties of the polymers according to the invention are clearly apparent from the Table.

We claim:

1. A photographic element comprising a support and at least one photosensitive silver halide emulsion layer, characterised in that said silver halide emulsion layer contains at least one polymer containing polymerised units of at least one compound A and at least one compound B which correspond to the following formulae:

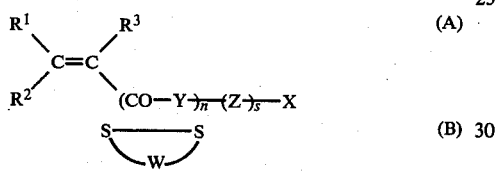

in which
R$^1$ represents hydrogen or an alkyl group;
R$^2$ represents hydrogen or an alkoxy carbonyl or carboxyl group;
R$^3$ represents hydrogen or an alkyl; cycloalkyl; aralkyl or aryl group a heterocyclic radical; or a carboxyl or alkoxy carbonyl group;
Y represents —O— or NR$^4$—;
R$^4$ represents hydrogen or an alkyl or hydroxy alkyl group;
Z represents a difunctional organic radical;
X represents hydrogen, a hydroxy group; an —O-alkyl; —S-alkyl; —SO-alkyl or —CO-alkyl group, a carboxyl group or a —CONR$^5$R$^6$; NR$^5$R$^6$ or —SO$_3$M group or a heterocyclic group;
R$^5$ and R$^6$ which may be the same or different represent alkyl groups or, together, represent the atoms required to complete a heterocyclic group;
M represents hydrogen or a cation;
n = 0 or 1;
s = 0 or 1;
W represents a difunctional hydrocarbon radical which may be interrupted by at least one heteroatom; and/or
R$^4$ together with Z and/or X represents the atoms required to complete a heterocyclic ring.

2. A photographic material as claimed in claim 1, characterised in that the polymer contains from 0.5 to 5% by weight of compound B.

3. A photographic material as claimed in claim 1, characterised in that the polymer is present in a quantity of from 500 mg of 500 g per mole of silver halide.

4. A photographic material as claimed in claim 1, characterised in that an acrylic derivative or acrylic acid is used as compound A.

5. A photographic material as claimed in claim 1, characterised in that at least one of the following compounds is used as compound B:

Compound 1.3 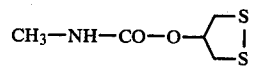

Compound 1.4 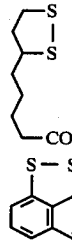

Compound 1.6 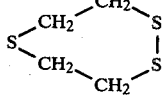

Compound 1.11 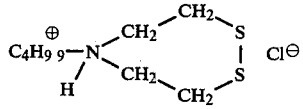

Compound 1.13 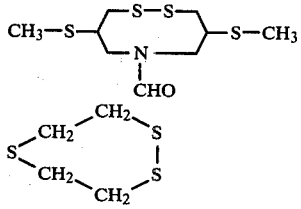

Compound 1.10

6. A photographic material as claimed in claim 1 wherein said polymer has a molecular weight of from 10,000 to 100,000.

* * * * *